F. M. STEUTERMAN.
FOLDABLE RECEPTACLE.
APPLICATION FILED JAN. 8, 1917.
1,377,638.
Patented May 10, 1921.
2 SHEETS—SHEET 1.
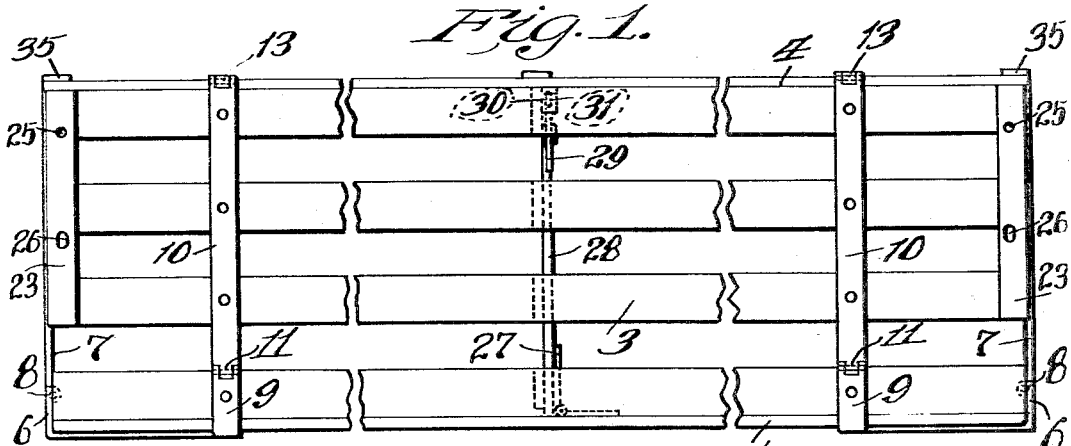
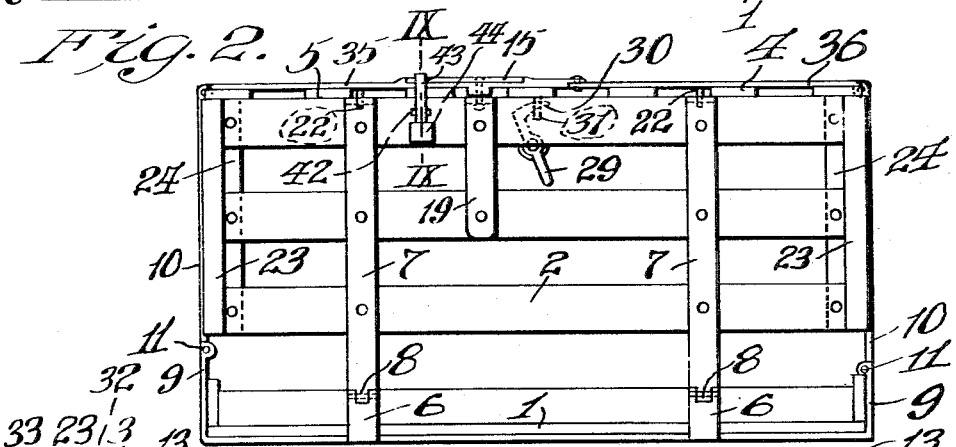
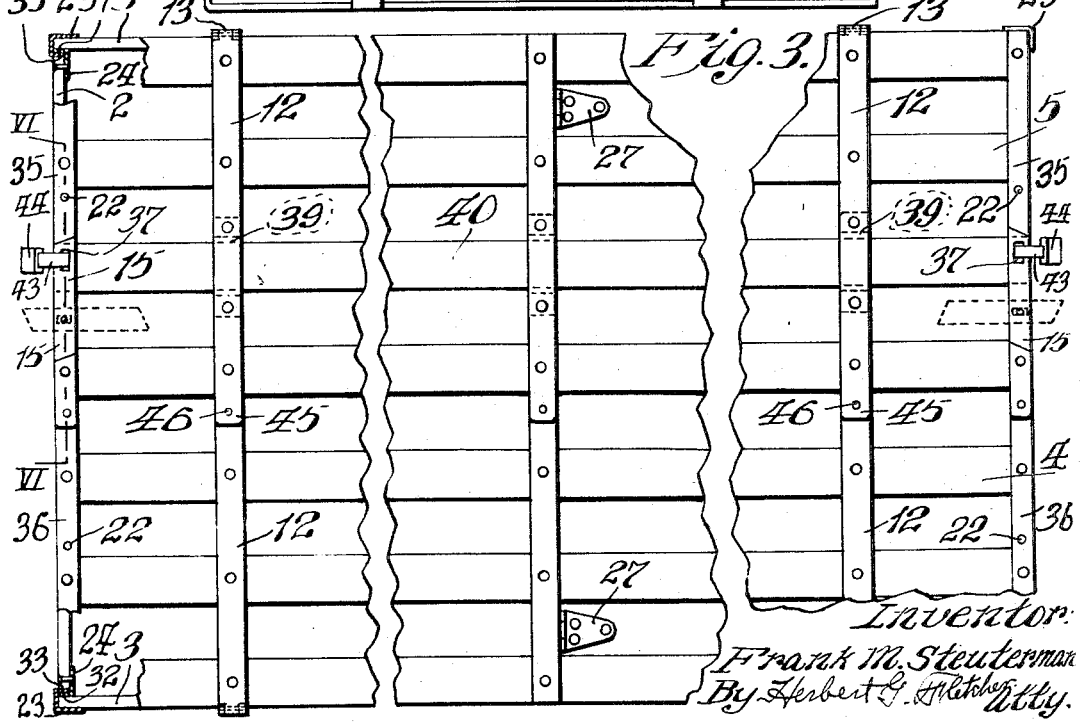
Inventor:
Frank M. Steuterman
By Herbert J. Hitchler
Atty.

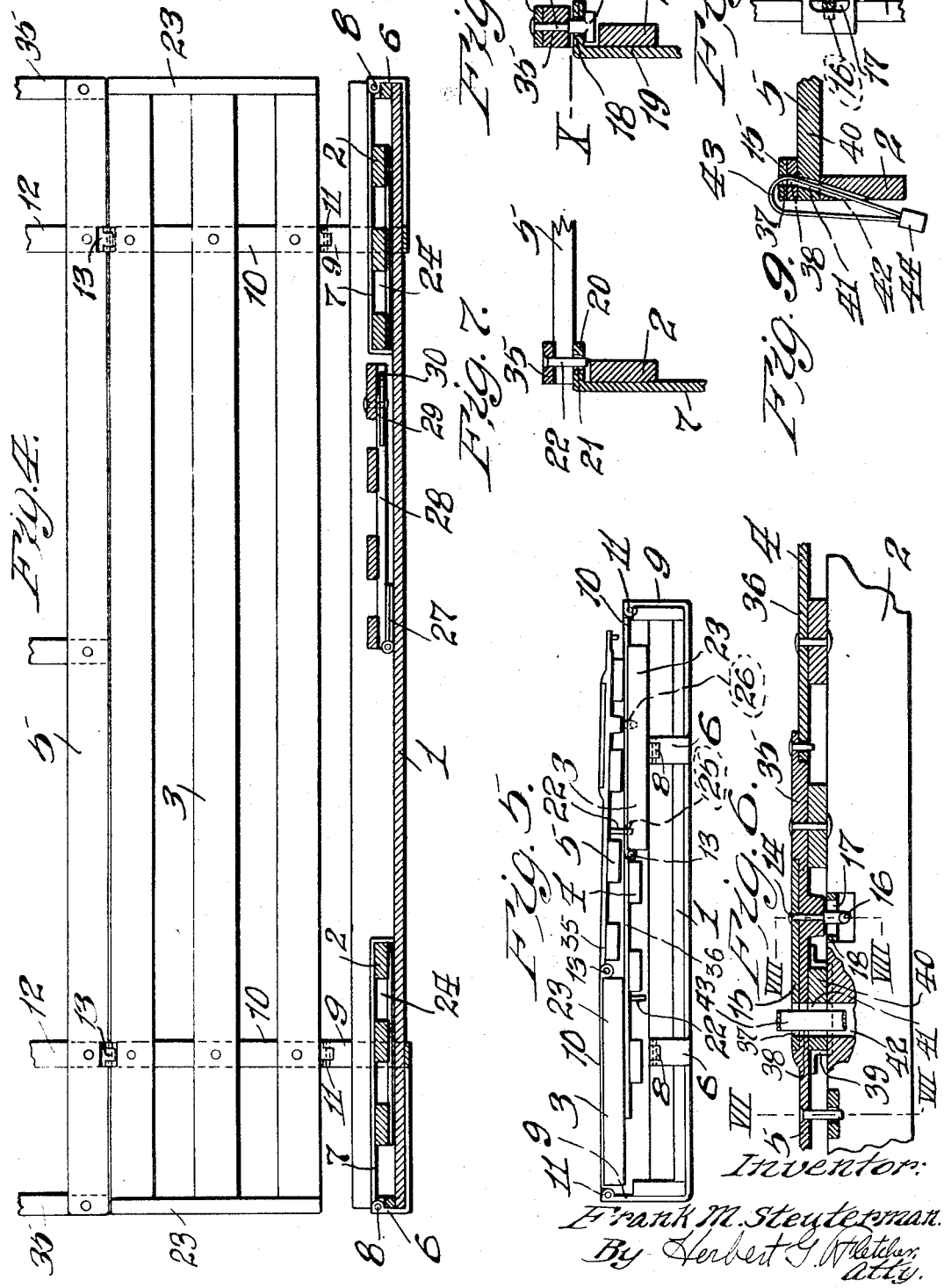

UNITED STATES PATENT OFFICE.

FRANK M. STEUTERMAN, OF ST. LOUIS, MISSOURI.

FOLDABLE RECEPTACLE.

1,377,638.          Specification of Letters Patent.      Patented May 10, 1921.

Application filed January 8, 1917. Serial No. 141,116.

*To all whom it may concern:*

Be it known that I, FRANK M. STEUTERMAN, a citizen of the United States of America, and a resident of the city of St. Louis, in the State of Missouri, have invented certain new and useful Improvements in Foldable Receptacles, of which the following is a specification.

One of the objects of this invention is to provide an improved foldable receptacle that is capable of having the foldable walls thereof interlock when they are moved to an assembled position.

Another object of this invention is to provide an improved locking means which is adapted to lock the walls of the receptacle in an assembled position, said locking means also being adapted to securely hold the walls of the receptacle in a folded or collapsed position.

A further object is to provide a foldable receptacle with an improved top wall support, said support providing means for preventing the top walls from being crushed inwardly when the receptacle is assembled as well as providing means for preventing said top walls of the receptacle from being pulled outwardly from the vertical walls.

Other and further objects will appear in the specification and be specifically pointed out in the appended claims, reference being had to the accompanying drawings exemplifying the invention, and in which, Figure 1 is a side elevation of this improved receptacle.

Fig. 2 is an end elevation of Fig. 1.

Fig. 3 is a fragmentary plan view of Figs. 1 and 2.

Fig. 4 is a longitudinal section taken through this improved receptacle showing the end walls in folded positions, and a portion of one of the top sections being shown swung upwardly on its hinges.

Fig. 5 is an end view of the device when the foldable parts thereof are in a collapsed position.

Fig. 6 is an enlarged fragmentary section taken on the line VI—VI of Fig. 3.

Fig. 7 is an enlarged fragmentary section taken on the line VII—VII of Fig. 6.

Fig. 8 is an enlarged fragmentary section taken on the line VIII—VIII of Fig. 6.

Fig. 9 is an enlarged fragmentary section taken on the line IX—IX of Fig. 2.

Fig. 10 is a fragmentary horizontal section taken on the line X—X of Fig. 8.

Referring to the drawings, this improved foldable receptacle comprises a bottom 1, end walls 2, side walls 3 and a pair of top walls 4 and 5. Leading from each end of the bottom 1 and extending upwardly are a pair of ears 6. Secured to each end wall 2 are a pair of metallic straps 7, and formed on the lower ends of each of said straps is a hinge 8, each pair of said hinges providing means for swingingly securing said end walls to their respective pairs of ears 6.

Leading from each side of the bottom 1 are a pair of upwardly extending ears 9, and secured to each of said side walls are a pair of straps 10, each of said straps having a hinge 11 formed on the lower end thereof, each pair of said hinges on each side providing means for swingingly securing said side walls to their respective ears 9. Secured to each of the top walls 4 and 5 are a pair of straps 12, each pair of said straps of each of said top members at one end being secured to the upper end of each pair of straps 10 by the hinges 13. Secured to the top wall 5 at each end is a metallic binding strip 35. Pivotally mounted to each of the straps 35 by a pin 14 is a locking plate 15, and formed on the lower end of each of said pins is an engaging portion 16, each of said engaging portions of said pins being adapted to pass through an elongated opening 17 which is formed in the right angle bent portion 18 of each of the metallic portions 19 one of which is carried by each of the end walls 2.

Secured to the top wall 4 at each end is a metallic binding strip 36. Formed on the upper end of each of the straps 7 is a right angled portion 20, and formed in each of said portions 20 is an opening 21, each of said openings being for the reception of an engaging pin 22, there being a pin 22 secured to each of the top wall strips 35.

Secured to each end of the side walls 3 is a channel member 23, and secured to each end of the end walls 2 is an angle member 24. Formed in each of the channel members 23, that are carried by the side wall 3, which is swingingly connected to the top wall 4, is a pin engaging opening 25, each of said channel members also having an elongated opening 26 formed therein.

Swingingly secured to the bottom 1, intermediate of its ends, by hinges 27 is a combined partition and support 28, and mounted at one end of said support is a swinging latch 29, said latch having a hooked portion 30 which is adapted to engage an eye 31, said eye being carried by the top wall 5.

In the operation of this improved foldable receptacle assuming it is desired to assemble the receptacle from the position as shown in Fig. 5, the top wall 5 and its respective side wall 3 are swung to an approximate vertical position, then the top wall 4 and its respective side wall 3 are also swung into an approximate vertical position, then the end walls 2 are in turn swung vertically and as they assume a vertical position, the lip 32 of each of the angle members 24 of said end walls will engage inside of the lip 33 of each of the channel members 23 of the side walls 2, thereby interlocking said end walls with said side walls so that said walls cannot be moved outwardly beyond an approximate vertical position. (See Fig. 3.)

The top wall 4 is then lowered, and as said top wall engages the upper portions of said end walls, the engaging pins 22, carried thereby will engage their respective openings 21 which are formed in the angular portions 20 of the straps 7, as shown in Figs. 2, 6 and 7.

In the receptacle shown in the drawings the figures represent a chicken coop or crate, and after the end walls 2 and side walls 3 have been assembled as described, the articles to be shipped are placed within the inclosure formed subsequently to the elevating of the partition or support 28. After the top wall 4 has been lowered into position as described, the top wall 5 is then lowered to a like position, the engaging pins 22 thereof engaging their respective openings 21 which are formed in the end walls 2, care of course being taken that the locking plates 15 are turned into the position shown in dotted lines in Fig. 3 so that the engaging portions 16 of the turnable pins 14 which are carried by said plates can pass through their respective elongated openings 17 which are formed on the metallic portions 19.

After the engaging portions 16 have passed through their respective openings 17, the locking plates 15 are returned to a position of alinement with their respective strips 35, to which they are mounted, which position will cause the engaging portions 16 to engage against the under side of their respective angular portions 18, (see Figs. 6 and 8).

Formed in each of the locking plates 15 is an opening 37, each of said openings adapted to aline with an opening 38 which is formed in each of the binding strips 35.

Carried by the top wall 5 is a pair of brackets 39, and slidably mounted in said brackets is a slat 40 which is for the purpose of providing access to the receptacle without unfolding the top 4. Formed in each end of said slat is an opening 41, said slat when in a closed position, as shown in Figs. 3, 6 and 9, having each of its openings 41 in alinement with each set of openings 37 and 38.

Formed in the upper portion of each of the end walls 2 is an opening 42. In order to properly lock and seal this improved receptacle after the articles to be shipped have been placed therein, after the locking plates 15 have been moved to their positions of locking, a metallic strip or wire 43, pertaining to the seal 44 is inserted through each set of alining openings 37, 38 and 41, and through each of the openings 42. After the seals have been properly fixed, it is readily seen that the locking plates 15 and the slidable slat 40 cannot be moved from their closed positions without the breaking of the seals.

The centrally arranged support 28 in addition to serving as a partition also serves as a brace or reinforcement to the top walls 4 and 5, as against said top walls being crushed inwardly by reason of weighty articles being mounted on top of the receptacle, and in order to prevent said top walls from being pulled outwardly, as in the case of handling this improved receptacle, in which the receptacle will be lifted by engagement with the slats of the top wall; the swinging latch 29 when engaged will cause its hooked portion 30 to be engaged in the eye 31, thereby tying the top walls to the support 28. It is to be noted that extending portions 45 are formed on the straps 12 of the top wall 5, said extending portions being adapted to overlap the ends of the straps 12 of the top wall 4.

Pins 46 are carried by said extended portions 45 for engagement with openings that are formed on the ends of the straps 12 of the top wall 4. Other pins such as 46 are carried on the extending ends of the strips 35, said pins being adapted to engage respective openings that are formed in the strips 36.

When it is desired to fold or collapse this improved receptacle, the hook 30 of the latch 29 is disengaged from its eye 31, then the locking plates 15 are moved to an unlocked position and the top wall 5 is swung upwardly, then the top wall 4 is swung to a like position and the end walls 2 are folded downwardly as is the support 28 and allowed to rest on the bottom 1, as shown in Fig. 4. The top wall 4 and its respective side wall 3 are then folded inwardly, said top wall 4 and its side wall being laid in extended positions as shown in Fig. 5 on top of the folded end walls 2 and support 28. The top wall 5 and its respective side wall 3 are then folded in the extended positions on top of the top wall 4 and its respective side wall 3. In this manner of folding, the pins 22, which are carried by the strips 35 will each be engaged in one of the openings 25 of each of the channel members 23 of the side wall 3 which is swingingly related to the top wall 4, and each of the locking members 16 will be engaged in each of the elongated openings 26 of said side wall 3 which are formed in said channel members 23.

The locking plates 15 are then turned to a position of locking in which the walls as folded, and as shown in Fig. 5, will be securely held together in their folded or collapsed positions.

What I claim is:

1. A foldable receptacle comprising top walls, side walls and end walls, a pair of engaging members carried by each of said side and end walls, each member of each of said side walls adapted to interlock with a mating member of said end walls when said walls are moved to approximate vertical positions, a pair of locking members and a slidable slat carried by one of said top walls, each of said locking members being located on each end of said top wall, and each being coöperable with the upper edge of a respective end wall for preventing said end walls being moved inwardly and there being means provided on each locking member coöperable with said slat for the introduction of a securing element, said locking members also being coöperable with one of said side walls when all of said walls are laid against each other in collapsed positions.

2. A foldable receptacle comprising side walls and end walls, a pair of interlocking members carried by each of said walls, each member of each of said side walls adapted to interlock with a mating member of said end walls when said walls are moved to vertical positions, a top wall swingingly secured to each of said side walls one of said top walls having overlapping portions that are adapted to overlap portions of said other top wall, and a turnable locking member carried by said overlapping top wall located adjacent each end thereof adapted to lock said top walls with said end walls, thereby preventing said end walls being moved inwardly, each of said locking members also adapted to coöperate with one of said side walls when said overlapping top wall is laid thereagainst.

FRANK M. STEUTERMAN.